Figure 1:
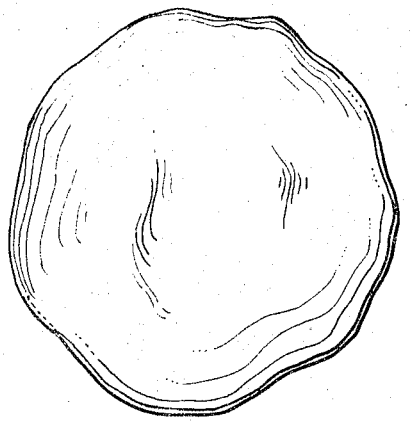
Figure 2:
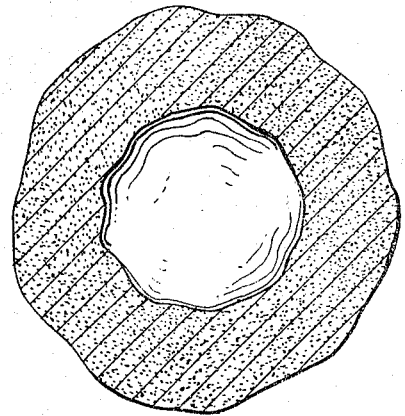
Figure 3:
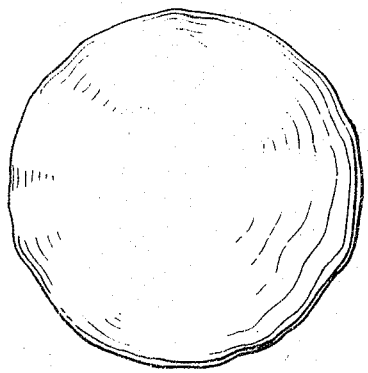
Figure 4:
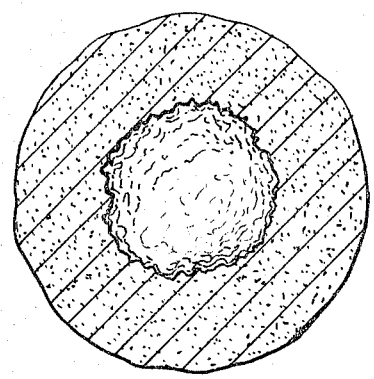

INVENTORS
William P. Moore
Charles B. R. Fitz-William, Jr.

BY *George B. Campbell*

ATTORNEY

3,318,887
CYANURIC ACID PRODUCTION
William P. Moore, Chester, and Charles B. R. Fitz-William, Jr., Richmond, Va., assignors to Allied Chemical Corporation, New York, N.Y., a corporation of New York
Filed July 17, 1964, Ser. No. 383,351
22 Claims. (Cl. 260—248)

This invention relates to the production of cyanuric acid from urea. More particularly, it relates to the production of said acid by a process which includes the production of, as an intermediate, free-flowing hollow pebbles comprising urea cyanurate.

Numerous methods have been proposed for the production of cyanuric acid from urea. These methods fall into four general categories which may be designated as follows: pyrolysis of urea in the presence of zinc chloride or ammonium chloride, pyrolysis of urea in organic solvents, pyrolysis of urea in a granulating type operation and pyrolysis of urea cyanurate.

The earliest methods for producing cyanuric acid from urea involved heating the urea to temperatures above 180° C. at superatmospheric pressures. The tendency of the urea to breakdown into ammnoia and carbon dioxide or polymerize to ammelide and ammeline was somewhat reduced by the inclusion of a compound such as ammonium chloride or zinc chloride. Nevertheless, this process was found to be accompanied by severe operational difficulties due to the build-up of solids on the inner wall of the synthesis vessel, which reduced heat transfer efficiency and required frequent interruption of the operation to permit its removal. Accordingly, such a process has little practical valve.

The conversion of urea to cyanuric acid in organic heat transfer media, such as hydrocarbon oils, is troubled by the same difficulties as the direct pyrolysis of urea. Solids build-up on the inner walls of the synthesis vessel while less severe, is none-the-less sufficient to render the process commercially unattractive. In addition, product obtained by this method is often discolored, and loss of the heat transfer media, particularly when glycol ethers are used, greatly increases the expense of this type of operation.

A more recent development is the so called "granulator process." In this process urea is converted to a reaction product consisting largely of cyanuric acid and ammelide by heating a mass of urea, preferably urea coated on solid particles of cyanuric acid, to a temperature of 240 to 350° C. at such a rate that urea is molten and de-ammoniated through a viscous plastic state to a hard, solid state, while continuously tumbling the reaction mass at a rate of speed that allows the material to convert largely into free-flowing granules of crude cyanuric acid and ammelide. While this process exhibits many advantages over those previously described, it is accompanied by several disadvantages. The rate of tumbling and the reactor retention time must be held in close control to prevent the viscous plastic material from caking on the walls of the reactor and to prevent the formation of very large lumps. One of the main difficulties with this process is the high loss caused by the tendency of urea or ammonium cyanate to vaporize and be carried along by hot gases, mainly ammonia, emitted from the reaction mass. A portion of the urea vapor carried off is actually pyrolyzed to cyanuric acid and forms a smoke of extremely fine particles which is difficult to recover by any normal means. This smoke loss can amount to as much as 40% of the urea fed to the reactor.

Belgian Patent 627,060 discloses the preparation of cyanuric acid from urea cyanurate. In accordance with one method disclosed in this patent, aqueous urea and cyanuric acid are heated to boiling and the urea cyanurate which precipitates therefrom upon cooling is separated, and can be subsequently converted to cyanuric acid by heating to temperatures of 180° C. or higher. Such a process, which involves the time consuming recovery of urea cyanurate, is undesirably complex and unnecessarily costly. In accordance with another method disclosed in this patent, solid particulate cyanuric acid is admixed with urea and heated to temperatures of 180° C. to 320 °C. at atmospheric pressure. The urea coats the cyanuric acid and reacts with it to form urea cyanurate which then converts to cyanuric acid. However, when operating in accordance with this process a large excess of cyanuric acid, for example a ratio of cyanuric acid to urea of 43:1 or 52:1 is used. The necessity of recycling such large amounts of cyanuric acid results in a tremendous throughput of material and consequent large apparatus and power requirement.

It is, therefore, an object of this invention to provide an improved method for producing cyanuric acid.

It is further an object of this invention to produce cyanuric acid by a method which does not require inert liquid media and can be carried out in the substantial absence of caking, sticking or balling.

Another object of this invention is to produce cyanuric acid by a method wherein losses and other problems attending volatilization of urea are substantially reduced.

A further object of this invention is to provide a continuous process for the production of cyanuric acid from urea in which the required cyanuric acid:urea mol ratio may be at a value sufficiently low that no substantial recycle burden is involved.

The foregoing objects and others which will be made obvious hereafter are achieved by the process of this invention in which pelleted urea alone or as a mixture of pelleted urea and pelleted biuret or a pelleted mixture of urea and biuret is repeatedly and substantially continuously brought into contact with finely divided cyanuric acid at a temperature in the range 125 to 160° C. to coat said pellets and produce hollow porous pellets comprising urea cyanurate or a mixture of urea cyanurate and biuret cyanurate, which cyanurate is subsequently heated to 190° to 310° C. with resultant conversion to cyanuric acid.

More particularly, in accordance with this invention, solid pellets of urea alone or in admixture with biuret in which the total amount of biuret is no more than 50% by weight of the urea and biuret present, preferably 4 to 20 U.S. mesh in size, are coated with finely ground cyanuric acid, preferably finer than 35 mesh, at temperatures no higher than 160° C. in a drum heater which is preferably either a rotary vessel with fixed flights or a stationary vessel having rotating internal flights. The material in the heater is raised in temperature to 125° C. to 160° C., at atmospheric pressure and the reactants are thereby formed into porous hollow balls chiefly comprising urea cyanurate or a mixture of urea and biuret cyanurates. The hollow balls are fed to a rotary reactor through which they continuously move, being subjected to temperatures ranging from 190 to 230° C. at the inlet to 275 to 310° C. at the exit, whereby hollow balls of cyanuric acid are produced. Part of the cyanuric acid product is ground to a fine powder and recycled for production of more hollow urea cyanurate, and the other part is removed for direct use or for further purification.

While, as indicated above, urea or mixtures of urea and biuret may be used in this process, for purposes of convenience, the following discussion will be limited to urea and urea cyanurate.

The size of the urea pellets is not critical and the process of the invention has been operated successfully with urea pellets over an inch in diameter. However, uniformity of size is desirable and when using 8 to 20 mesh pellets, preferably no more than about 8% of the urea pellets should be outside this range.

The relative size of the urea pellets and cyanuric acid particles is important inasmuch as it is necessary to obtain a uniform coating of the cyanuric acid on the urea. With 8 to 20 mesh urea pellets the finely ground cyanuric acid should all be smaller than 35 mesh, and preferably no more than 8% should be larger than 40 mesh, the bulk of it being between 60 and 325 mesh. It has been found that when the major portion of the urea pellets are not sufficiently larger in dimension than the major portion of the cyanuric acid particles, incomplete coating and non-uniform product is obtained and increased loss due to volatilization of urea is encountered. Preferably the diameter of urea pebbles should be 10-fold to 20-fold the diameter of the cyanuric acid particles.

The urea and cyanuric acid may be fed separately into the inlet end of the heater, but it is preferred to mix these materials prior to their introduction into the heater. It has been found that when the urea and cyanuric acid are premixed, even at temperatures as low as 30° C., cyanuric acid adheres to the urea pellet. It is desirable to have a coating on the urea pellet before it is subjected to the elevated temperatures, especially if such temperatures are in the higher portion of the specified range.

Sufficient cyanuric acid should be used to provide a substantial coating on each urea pellet. This is not to say that the urea pellets are completely enclosed by the cyanuric acid. The coating is discontinuous in that there are sufficient interstices to allow escape of ammonia which evolves during the process and also for migration of urea. A mol ratio of cyanuric acid to urea in the range of 0.5:1 to 2:1 should be used, and preferably about 1 mol of cyanuric acid is used per mol of urea. Excessive amounts of cyanuric acid are not detrimental to the process, but are uneconomical as previously indicated.

While finely ground cyanuric acid alone may be used to coat the pellets, it has been found that the flow characteristics of the product are greatly improved by the inclusion in the finely ground coating material of about 5% to about 20% by weight thereof of inert material. The inert material may be added as fine powder or may constitute a part of the cyanuric acid powder. The most convenient inert material to use in the process is ammelide which is formed as a by-product in the production of cyanuric acid from urea. It is almost completely inert under the conditions of the reaction and is convenient to use, as is also ammeline because it may be hydrolyzed with strong acid to cyanuric acid. Other inerts suitable for use are melamine, kieselguhr, expanded silica and limestone. It is important that the inert material used have the ability to adsorb and, together with the cyanuric acid, form a smooth, rounded coating over the urea pellets. It is also important that it may be readily removed from the product or that its presence not be objectionable. Silica or limestone may be left in the product in many cases, as for example where the product is to be used for swimming pool treatment.

The temperature of the heater, preferably a rotary drum type heater, into which the urea and cyanuric acid are fed, is maintained no higher than 160° C. It has been found that when temperatures in excess of 160° C. are used the urea tends to melt, the shells tend to rupture, and caking occurs. Preferably the heater is maintained at a temperature of 135° to 155° C.

In order to assure satisfactory development of the hollow cyanurate pellets, the rate of rotation of the heater should be maintained between 10 and 75 r.p.m. preferably between 15 and 25 r.p.m. depending on the size of the heater and its loading.

Pressure in the heater is not critical, and atmospheric pressure is conveniently employed.

While the urea cyanurate may be formed in batches, it is preferable to operate a continuous process which involves continuously feeding the urea and cyanuric acid into the heater and causing it to pass continuously through the heater with a retention time of at least 10 minutes, about 15 to 45 minutes being required under preferred heating conditions.

The cyanurate product exiting the rotary heater is in the form of hollow pellets, each having an external diameter about 20 to about 50%, usually about 30 to 35%, greater than the diameter of the urea pellet used in its production. These hollow pellets have a wall thickness equal to about 10% to 40%, usually 20%–25%, of the diameter fo the urea pellet and an interior void having a diameter equal to about 40% to 80%, usually 60%–65% of the diameter of the urea pellet. Expressed another way, the hollow cyanurate pellets have an internal diameter ranging in size from about 1 to about 8 times their wall thickness, and usually about 2 to 3 times their wall thickness. These relative dimensions are, to a certain extent, dependent upon the size and capacity of the rotating vessel, since the density of the wall and the amount of material abraded therefrom will be determined by the opportunity one pellet has for coming into contact with others.

In the attached drawing, FIGURES I and III represent greatly magnified pellets of urea cyanurate and cyanuric acid, respectively. The cyanuric acid pellet is slightly smaller and smoother than the cyanurate pellet from which it is produced, probably as a result of the additional abrasion to which it is subjected. FIGURES II and IV show a cross section of a halved urea cyanurate and cyanuric acid pellet, respectively. Under a microscope, the cyanuric acid pellet appears to be more porous than the cyanurate pellet and to have a rougher interior wall.

The cyanurate product may be cooled, stored and/or crushed prior to being used in the production of cyanuric acid, but preferably it is continuously and directly fed to a reactor maintained at a temperature ranging from 190° to 230° C., at its inlet to 275° to 310° C., at its exit, for conversion to cyanuric acid.

The preferred temperature range in the cyanuric acid reactor is 285 to 310° C. This reactor, which is preferably a rotary vessel, is preferably maintained at pressures in the range of 300 to 700 mm. Hg absolute. This use of sub-atmospheric pressure is desirable because the production of cyanuric acid is most efficient when the liberated ammonia gas is swiftly removed from the reaction mixture. With the hollow urea cyanurate pebbles, operation at such reduced pressures is effective and, unlike prior art methods, there is little or no loss of urea by vaporization. Moreover, because the pebbles are free-flowing they may be fed easily through a conventional air-lock such as a star feeder. Atmospheric pressure and pressure above atmospheric may also be employed, but the use of these higher pressures inhibits the removal of ammonia and promotes the formation of ammelide and ammeline.

Speed of rotation of the cyanuric acid reactor is somewhat dependent on its diameter and loading and normally should be at least 5 r.p.m., and should not exceed 30 r.p.m.

Retention time of the reactants in the cyanuric acid reactor is about 10 to 90 minutes, preferably about 20 to 40 minutes.

In the reactor the urea cyanurate pellets are converted progressively, from the outside in, to cyanuric acid which in large measure retains the porous pellet form. Thus, a more controlled conversion is attained than would be if the cyanurate were in a form having a larger surface: weight ratio.

The material exiting the cyanuric acid reactor, which is in the form of hollow pellets when the cyanurate pellets are used as reactor feed, contains about 85 to 98% cyanuric acid and about 2 to 15% ammelide. About 50 to 75% is ground up and recycled for additional urea cyanurate production. The remaining portion can be prepared for shipment or further purification, depending upon its intended use.

When the foregoing process is carried out the cyanuric acid coated urea is converted to hollow pebbles of crude urea cyanurate, which is then pyrolyzed in good yield to cyanuric acid having excellent flow characteristics. Based on amount of urea fed to the system and amount of cyanuric acid and materials readily convertible to cyanuric acid by hydrolysis recovered yields as high as 95% of theory have been obtained.

The loss of urea by vaporization is essentially eliminated because the cyanuric acid powder shells around the urea pebbles provide, in effect, scrubbing devices. Unconverted urea within the pellets is at all times protected by the shell of cyanuric acid and/or urea cyanurate so that the vaporizing effect of gases present in the reactors is minimized.

Moreover during cyanuric acid formation the mass of pellets whose outermost surface is essentially a porous layer of cyanuric acid by repeated contact with evolved ammonia serves to scrub this gas and remove therefrom any entrained urea vapors.

After the urea and cyanuric acid enter the rotary heater, the urea is coated with the cyanuric acid, and as the urea diffuses it reacts with the cyanuric acid coating to form urea cyanurate. The urea continues to diffuse during the passage of the reaction mass through the heater and passes through the interstices of the coating, reacting with more cyanuric acid which adheres to the pellet. By the time the material reaches the exit end of the rotary heater, most of the urea has reacted leaving a spherical void in the center of the urea cyanurate pellet. Migration of urea vapor through the cyanuric acid powder appears to play an important part in the formation of the urea cyanurate pellets and the process can in fact be carried out below the melting point of urea. The vapor pressure of urea rises rapidly at temperatures slightly above the melting point and the reaction proceeds more rapidly at these higher temperatures. Observation of this process in a glass reactor, has revealed no visible viscous plastic phase, and substantially no caking or sticking and no balling apart from accretion to the entering pellets.

When the urea cyanurate is subsequently heated in the cyanuric acid reactor, ammonia is evolved as part of the reaction by which cyanuric acid is formed. This ammonia apparently passes through the interstices in the cyanurate pellet. Any urea still present in the pellet converts to cyanuric acid, and there is no tendency to stick, cake or ball.

*Example I*

This example demonstrates the preferred method for the production of cyanuric acid (CA) from urea. Parts are in pounds per hour.

Step 1.—From a urea feed hopper 34.1 parts of "Arcadian" pelleted (screen size 5 to 20 mesh) urea assaying 97.7% urea, is fed to a feed trough where it is moved forward and mixed with 67.1 parts of ground (screen size 100 to 325 mesh) recycled crude cyanuric acid containing about 12% by weight ammelide from a Wiley Mill. The mixed solids are continuously fed to a feed pebbler which is a rotary steam tube heater with a solids retention time of 20 minutes with temperature ranging from 30° C. (inlet) to 140° C. (discharge). The pellets of urea are coated with ground CA containing ammelide and the urea from the center of the particle largely reacts with the CA to form urea cyanurate. Some of the urea is unaffected and some splits out ammonia and small amounts of water to form biuret and guanidine. The vapors, 0.7 part, are vented off and the 100.5 parts of CA reactor feed in the form of hollow balls are continuously discharged with the following composition:

| Component: | Wt. percent |
|---|---|
| Urea cyanurate | 85.9 |
| Urea | 2.9 |
| Biuret | 2.7 |
| Ammelide | 8.1 |
| Guanidine | 0.4 |
| Total | 100.0 |

Step 2.—The solid product discharged at 140° C., is passed directly and continuously to the CA reactor. The reactor consists of a closed externally gas fired rotary stainless steel oven 2 ft. in diameter and 8 ft. long, with inlet at one end and discharge at the other, both provided with air-locks. Ahead of the air-lock at the discharge end is a vent to a high capacity blower which maintains the pressure in the CA reactor 2–6 inches of water below atmospheric pressure. The gases evolved from the urea cyanurate pellets during their conversion to cyanuric acid are discharged by the blower for ammonia recovery and amount to 11.3 parts.

The temperature of the reactants in the CA reactor increases from 230° C., near the inlet end of the reactor to 300° C., at the exit end. After a retention time of about 30 minutes about 89.3 parts of crude product is discharged and allowed to cool. It has the following composition:

| Component: | Wt. percent |
|---|---|
| Cyanuric acid | 87.8 |
| Ammelide | 12.2 |
| Total | 100.0 |

67.1 parts of the crude CA are milled to 100 to 325 mesh and then recycled to the first step. The remaining 22.2 parts of crude product may be used as such or digested in known manner with a strong mineral acid to convert ammelide to cyanuric acid. In this way a product containing by weight 99.0% cyanuric acid and 0.2% ammelide is obtained.

Overall process yield based on urea charged to the system and purified cyanuric acid recovered is 87%.

*Example II*

This example demonstrates batch production of cyanuric acid from pebbled urea using cyanuric acid and ammelide to form hollow pebbles for reactor feed, and illustrates that urea can be converted to cyanuric acid via urea cyanurate using just one heating vessel.

To a 300 ml. Morton flask is added 30.0 grams of commercial pelleted urea screened so that all pellets were retained on 20 U.S. mesh screen. The Morton flask is fitted to a Rinco rotating device so that it can be rotated 20° from the horizontal plane at 60 r.p.m. with or without vacuum applied. Crude cyanuric acid, 71.5 grams, is then added with the following composition:

| Component: | Wt. percent |
|---|---|
| Cyanuric acid | 84.5 |
| Ammelide | 15.5 |
| Total | 100.0 |

The rotating Morton flask at atmospheric pressure is heated for 30 minutes in a silicone oil bath maintained at 134–139° C. After 7 minutes heating all the cyanuric acid and ammelide powder dust coat the dry pebbles. The reactor is clean, dry and dust free during the 30 minute preparation time. A sample of the flask's contents is found to be predominately hollow balls, slightly larger than the urea pebbles. The pebbles contain urea cyanurate, ammelide, biuret, urea and guanidine. The outer surface is coated with a smooth layer consisting in a large part of fine inert powder.

The temperature of the silicone oil bath is then increased to 280° C., and the rotating flask again lowered into the bath. The Rinco rotating device is connected to a water aspirator so that pressure in the system is maintained at 25-100 mm. Hg for a 60 minute period. During this period the flask is rotated at 60 r.p.m. with bath temperature varying from 273-283° C. During the heating period the walls of the flask remain clear while ammonia is evolved from the reaction mixture. After 60 minutes, the flask is removed from the bath and allowed to cool.

The cooled hollow pebbled product appears to have a smooth round surface. A total of 90.7 grams of solid product with the following composition is recovered.

| Component: | Wt. percent |
|---|---|
| Cyanuric acid | 86.1 |
| Ammelide | 13.9 |

The net cyanuric acid produced amounts to a yield of 82.1% based on urea fed. Acid hydrolysis of the synthesis product increases yield to about quantitive by conversion of ammelide to cyanuric acid. The dried cyanuric acid after hydrolysis analyzes 99.8%. The synthesis and hydrolyzed products are free flowing, showing no tendency to cake, stick, lump or bridge when stored or when poured from one container to another.

*Example III*

This example demonstrates the use of inorganic inerts in the production of free-flowing cyanuric acid. The apparatus used is the same as that used in Example II.

The following ingredients are added to the Morton flask:

| | Grams |
|---|---|
| Commercial pelleted urea | 30.0 |
| Purified cyanuric acid (99.5% assay) ground and screened through 100 mesh (U.S.) screen | 65.0 |
| Kieselguhr, commercial ground and screened through 200 mesh (U.S.) screen | 5.0 |

The flask is rotated for 30 minutes at atmospheric pressure in an oil bath held at 129-151° C. Hollow pebbles having smooth outer surfaces rich in kieselguhr are recovered. The rotating flask is then lowered into the high temperature bath at 280° C., for 60 minutes with bath temperature varying from 271 to 302° C. The rotating flask is then cooled and the product is found to be free-flowing and free of dust. The solid product weighs 89.4 grams and has the following composition:

| Component: | Wt. percent |
|---|---|
| Cyanuric acid | 92.2 |
| Ammelide | 2.3 |
| Kieselguhr | 5.5 |
| Total | 100.0 |

The net yield of cyanuric acid based on urea fed is 83.4%. The product is suitable for direct packaging and use, for example, as a swimming pool treating compound.

We claim:

1. The process for producing urea cyanurate which comprises heating to a temperature no higher than 160° C., a mixture of finely divided cyanuric acid and solid pellets of urea, repeatedly and substantially continuously bringing said pellets into contact with said finely divided cyanuric acid so as to coat said pellets and thereby produce porous hollow urea cyanurate pellets.

2. The process of claim 1 wherein the temperature is maintained between 125° C., and 160° C., and the urea contains no more than 50% biuret.

3. The process of claim 2 wherein substantially all of the finely divided cyanuric acid is finer than 35 U.S. mesh and no more than 8% of the urea pellets are of a mesh size outside the range 8 to 20 U.S. mesh.

4. The process of claim 2 wherein the cyanuric acid contains a small amount of ammelide.

5. The process of claim 2 wherein the heating is carried out for a period of 15 to 45 minutes.

6. The process of claim 2 wherein the ratio of mols of cyanuric acid to mols of urea is 0.5:1 to 2.0:1.

7. The process of claim 2 wherein the mixture contains about 8% to about 20% of finely ground inert powder.

8. The process of claim 2 wherein agitation is accomplished by means of a drum rotating about a horizontal axis.

9. The process of producing cyanuric acid which comprises heating to a temperature in the range 190° to 310° C., porous hollow urea cyanurate pellets.

10. The process of claim 9 wherein the cyanurate pellets contain a small amount of finely ground inert powder.

11. The process for producing cyanuric acid which comprises heating to a temperature no higher than 160° C., a mixture of finely divided cyanuric acid and solid pellets of urea, repeatedly and substantially continuously bringing said pellets into contact with said finely divided cyanuric acid so as to coat said pellets and thereby produce urea cyanurate in the form of porous, hollow pellets and heating said urea cyanurate at a temperature in the range from 190° to 310° C., to convert it to cyanuric acid.

12. The process of claim 11 wherein the heating temperature in forming urea cyanurate is between 125° C., and 160° C., and the urea contains no more than 50% biuret and gases are withdrawn during heating of the urea cyanurate to maintain a pressure below atmospheric.

13. The process of claim 11 wherein the urea cyanurate is in the form of hollow pellets when it is heated in the range 190° to 310° C.

14. The process of claim 12 wherein substantially all the finely divided cyanuric acid is finer than 35 U.S. mesh and no more than 8% of the urea pellets are of a mesh size outside the range 8 to 20 U.S. mesh.

15. The process of claim 12 wherein the heating at 125° C. to 160° C., is carried out for a period of 15 to 45 minutes.

16. The process of claim 13 wherein the mixture heated to a temperature of 125 to 160° C., comprises 50 to 80% cyanuric acid and 15 to 45% urea by weight.

17. The process for producing cyanuric acid which comprises heating, with agitation, to 125° to 160° C. for about 15 to about 45 minutes, a mixture of finely divided cyanuric acid finer than 35 U.S. mesh and solid pelleted urea of which at least 92% has a mesh size within the range 8 to 20 U.S. mesh to produce hollow pellets consisting essentially of urea cyanurate, and heating said hollow pellets, with agitation for 10 to 90 minutes at 190° to 310° C. to convert said hollow pellets to said cyanuric acid.

18. The process of claim 17 wherein the mixture of cyanuric acid and urea contains also about 8% to about 12% by weight of the cyanuric acid of a finely divided inert powder.

19. The process of claim 18 wherein the urea cyanurate is heated within the range 190 to 310° under a pressure of 100 to 760 mm. Hg abs.

20. The process of claim 19 wherein 50 to 75% of the cyanuric acid product is recycled to be admixed with additional urea.

21. The process for the production of cyanuric acid which comprises admixing one part by weight pelleted urea with about 2 parts ground crude cyanuric acid containing about 12% by weight ammelide, agitating said mixture in a rotary heater maintained at a temperature ranging from about 30° C., at its inlet end to about 140° C., at its discharge end for about 20 minutes, whereby said pelleted urea is coated with the ground cyanuric acid containing ammelide and reacts with said cyanuric acid to form urea cyanurate, feeding the resulting hollow balls comprising urea cyanurate and ammelide to a rotary reactor maintained at a temperature ranging from 230° C., near its inlet and 300° C., at its exit.

22. The process of claim 21 wherein the mixture of pebbled urea and crude cyanuric acid is continuously fed to the rotary heater and continuously passes therethrough, the heater is maintained at a pressure substantially atmospheric and the crude cyanuric acid exiting the rotary reactor is in part ground and recycled for admixture with pebbled urea and in part digested in aqueous strong acid.

References Cited by the Examiner
UNITED STATES PATENTS 3,154,545  10/1964  Symes et al. _____ 260—248

WALTER A. MODANCE, *Primary Examiner.*

JOHN M. FORD, *Assistant Examiner.*